A. E. PAIGE.
MECHANISM FOR MAKING BIFOCAL LENSES.
APPLICATION FILED JUNE 5, 1915. RENEWED DEC. 12, 1919.
1,347,653.
Patented July 27, 1920.
8 SHEETS—SHEET 6.
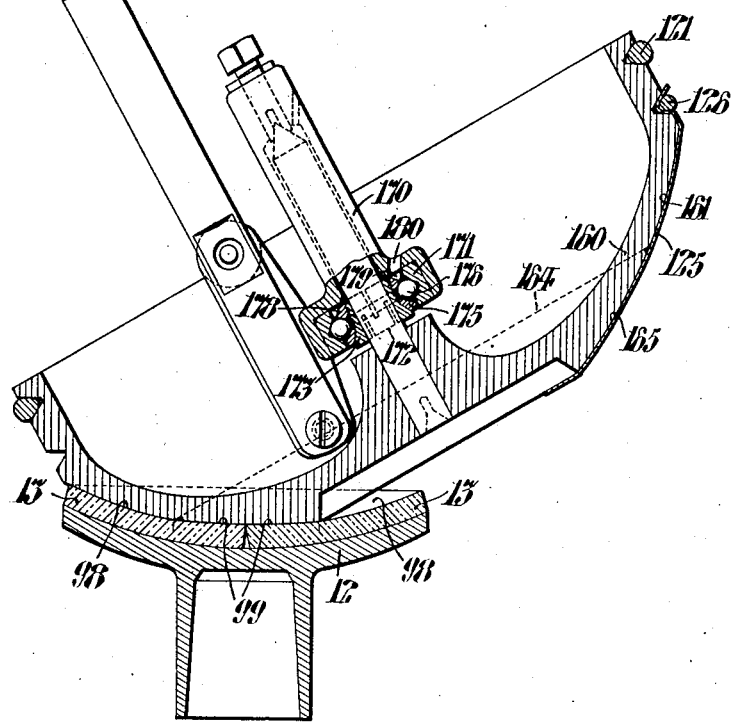
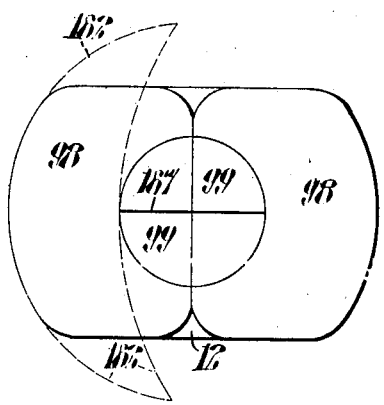
WITNESSES
Frank E. Paige
Philip W. Vessey
INVENTOR:
Arthur E. Paige

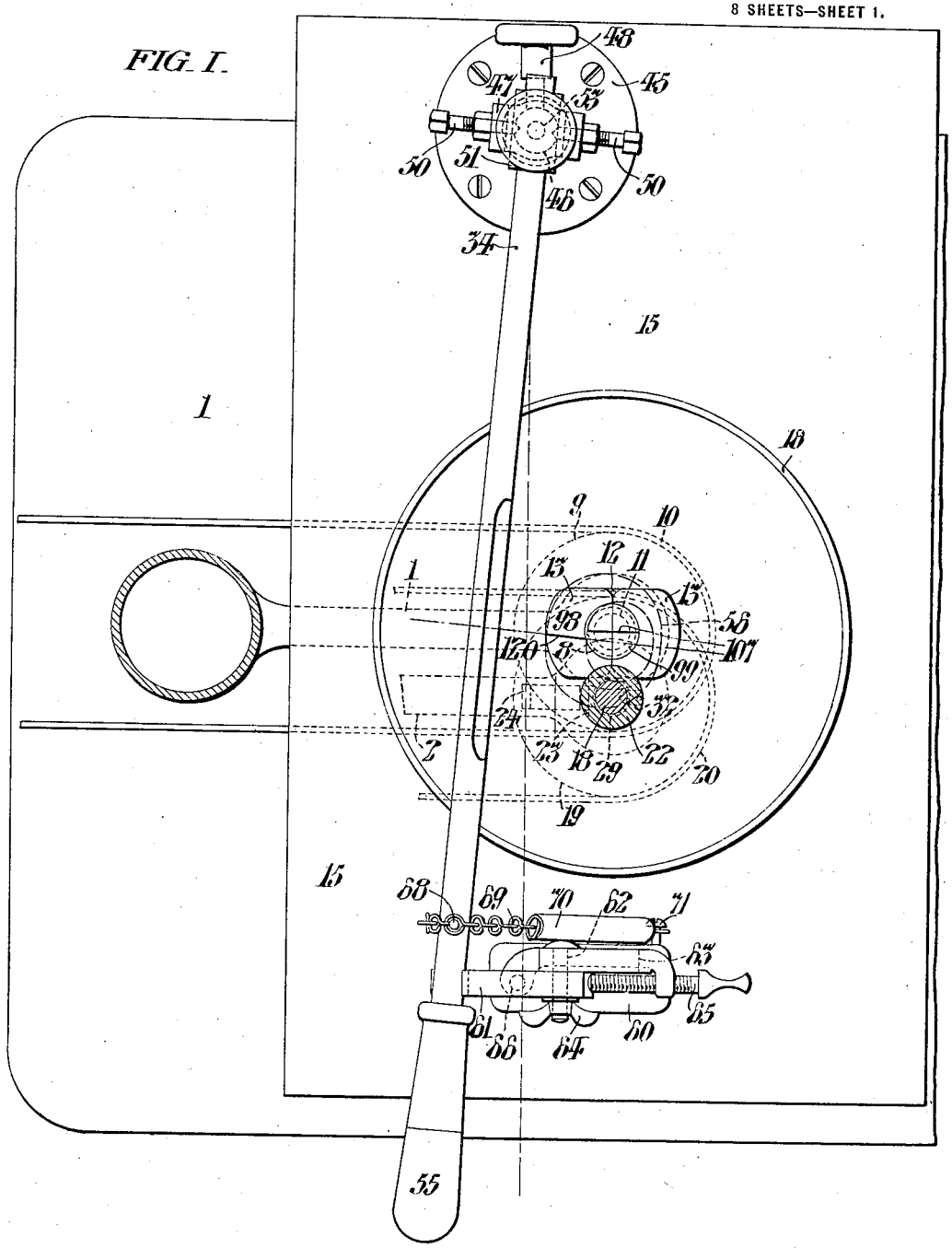

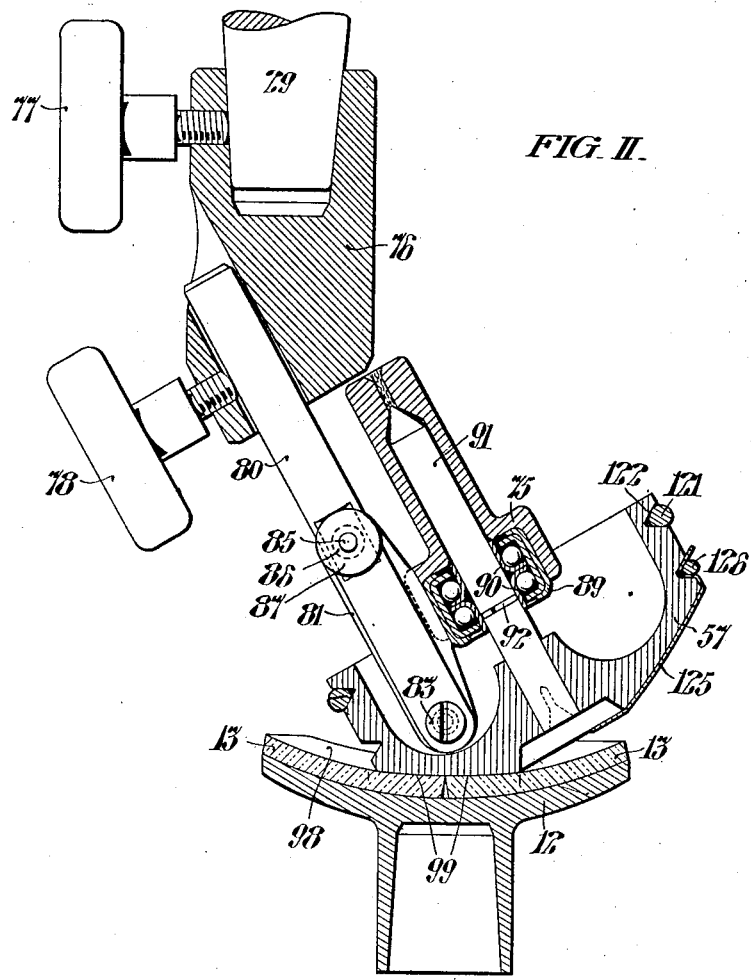

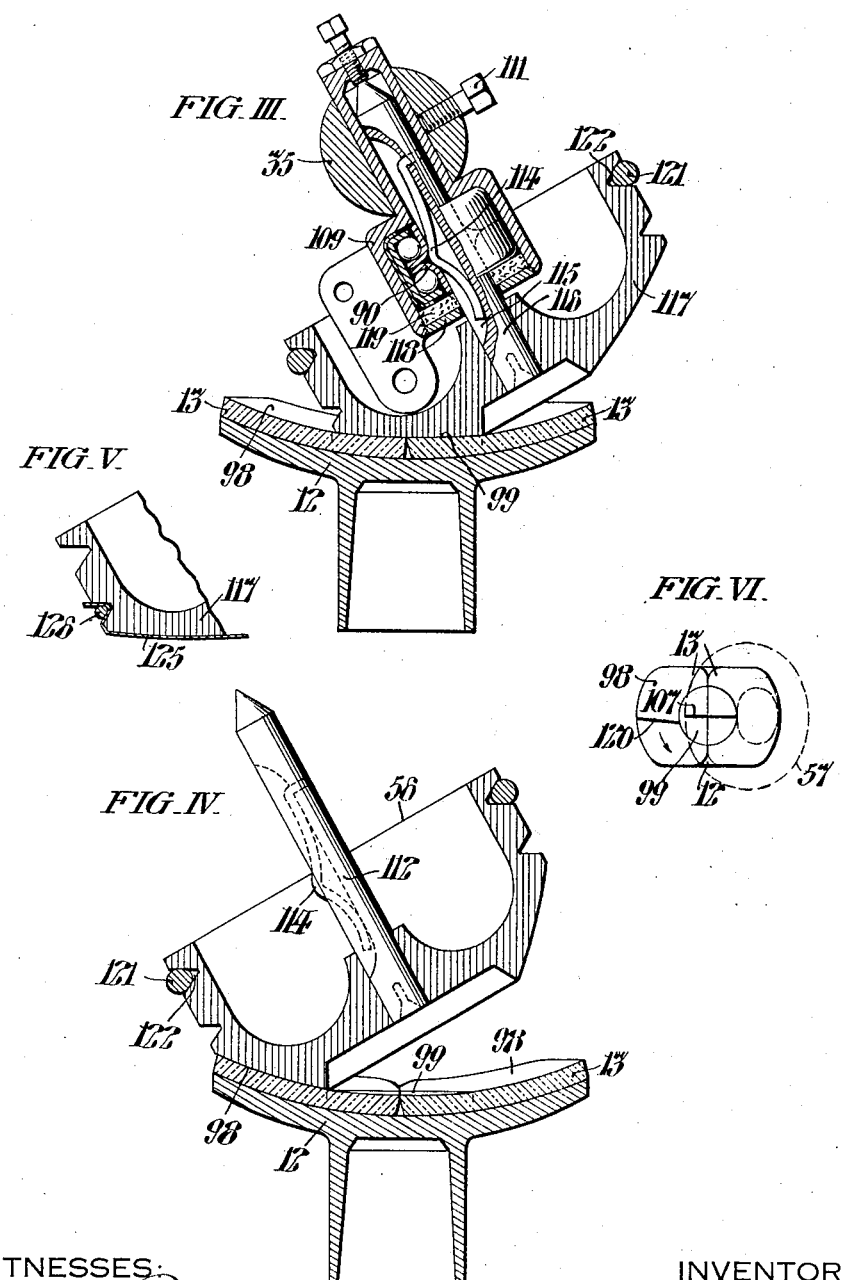

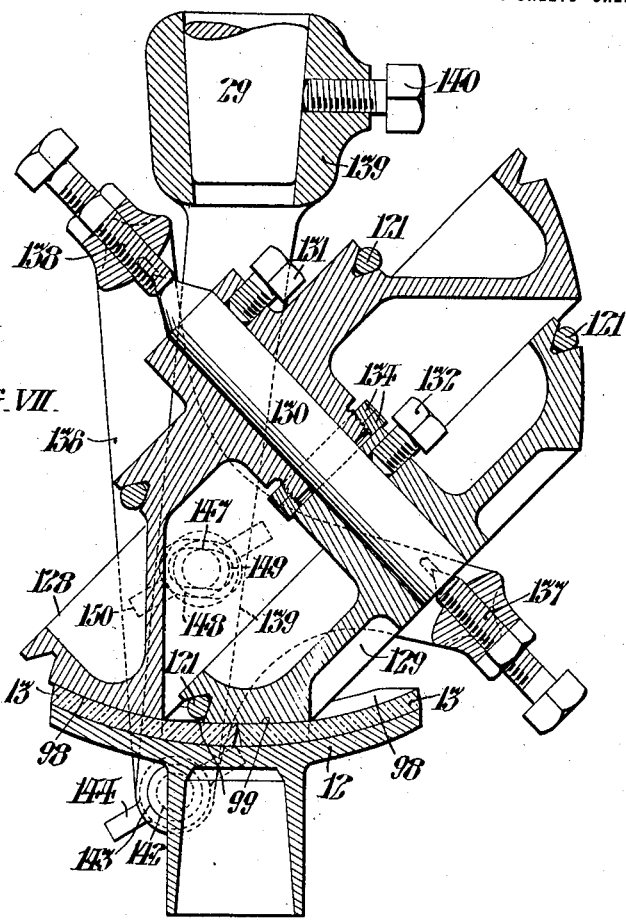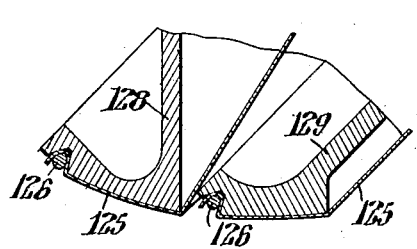

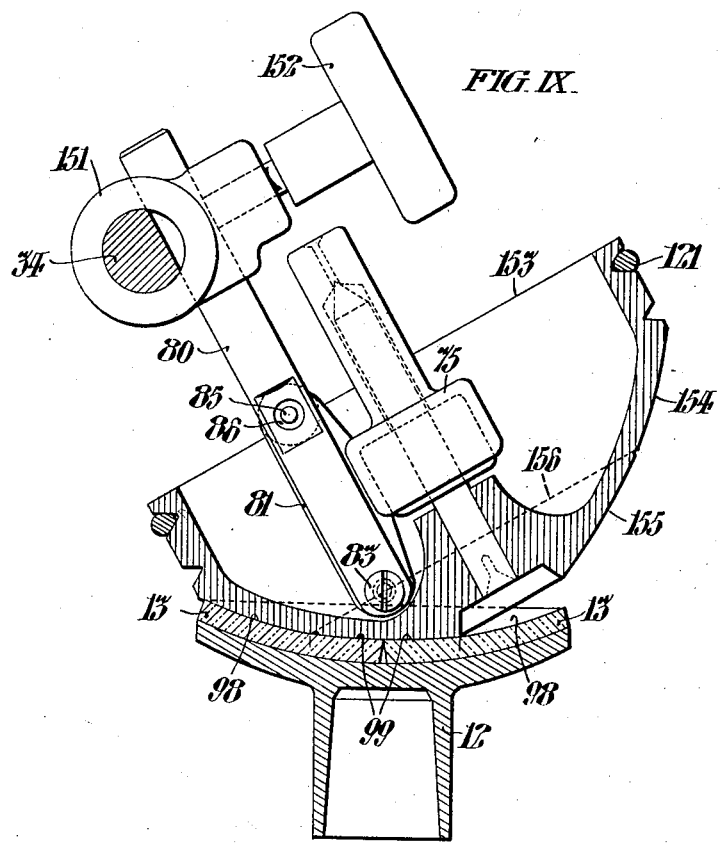
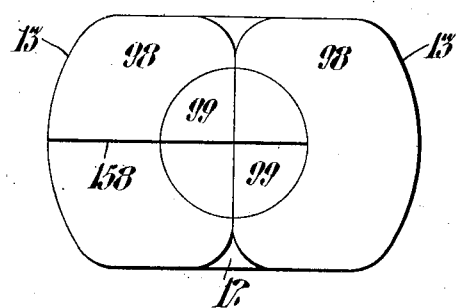

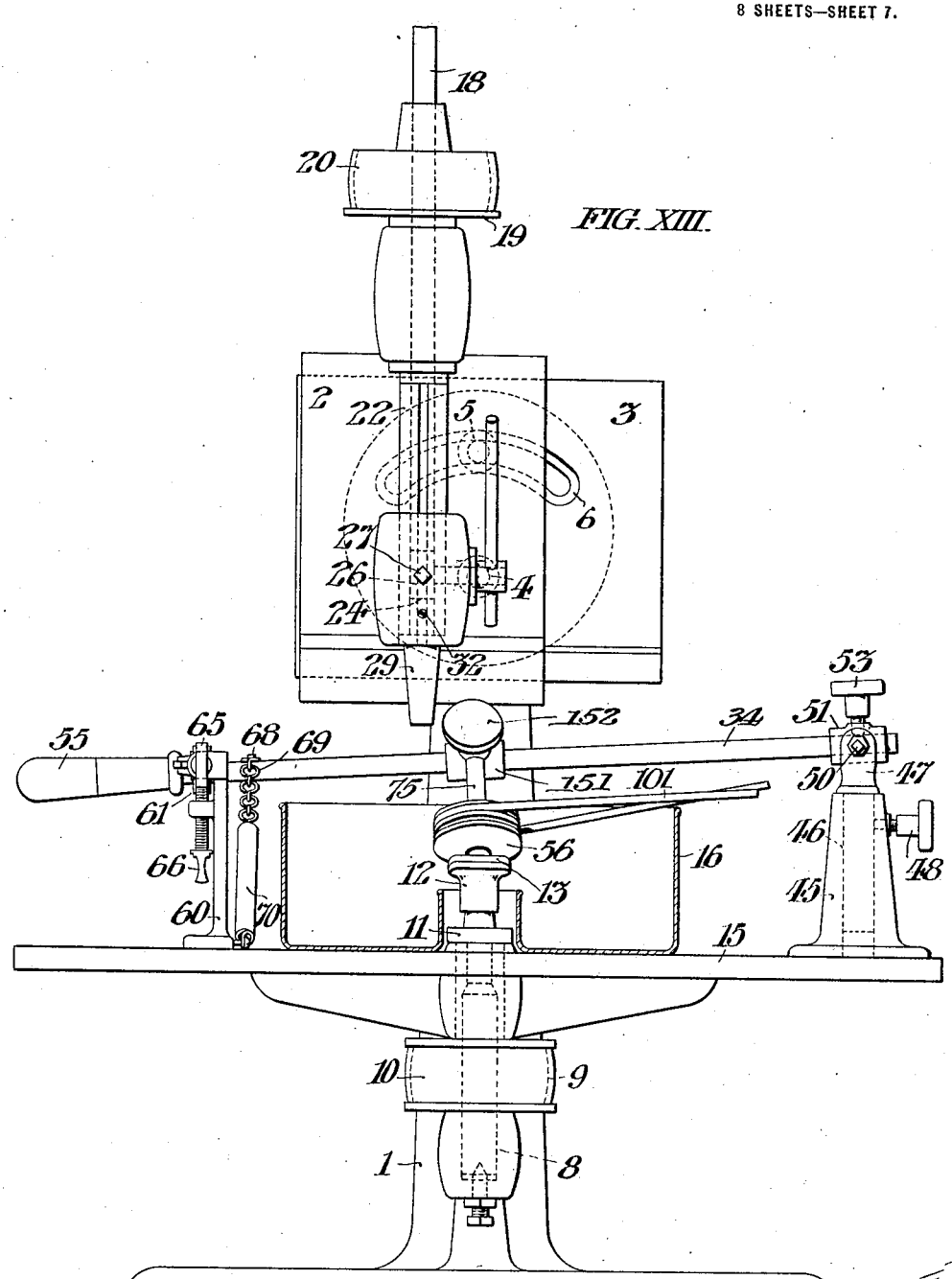

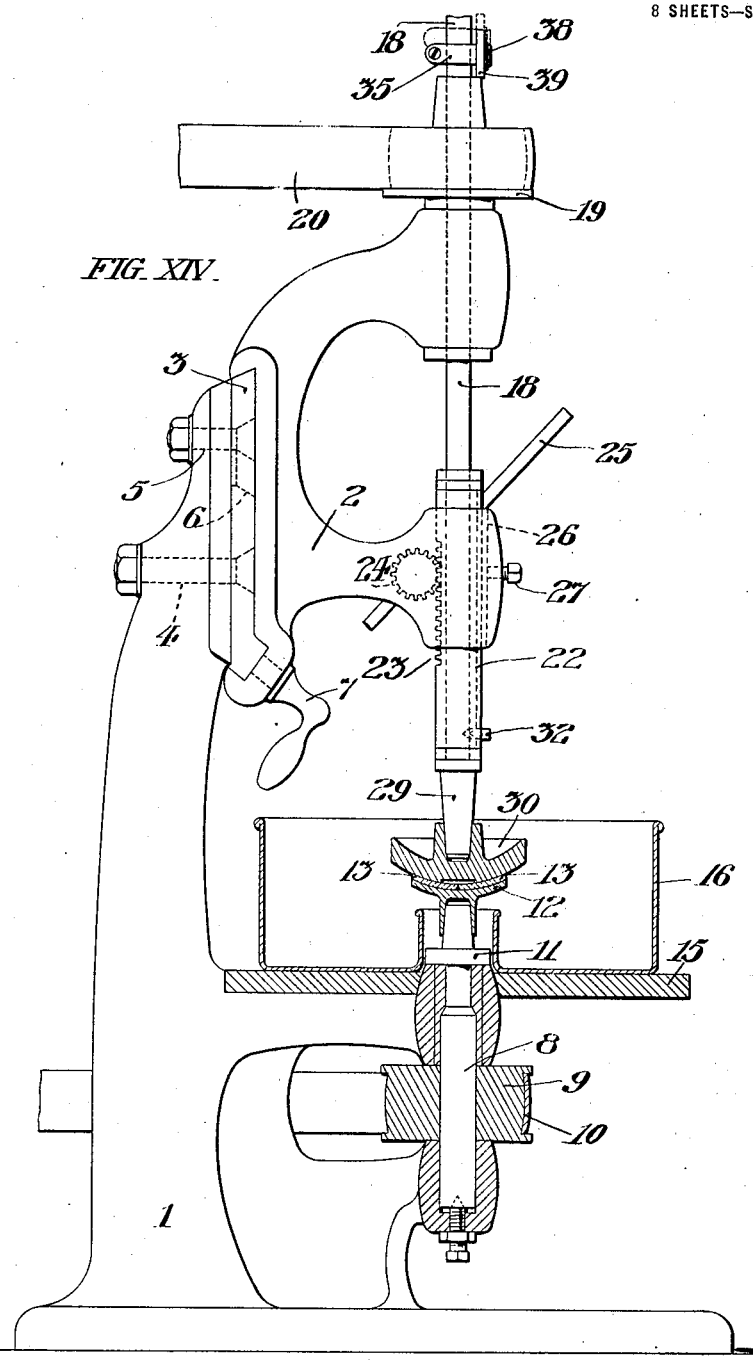

UNITED STATES PATENT OFFICE.

ARTHUR E. PAIGE, OF PHILADELPHIA, PENNSYLVANIA.

MECHANISM FOR MAKING BIFOCAL LENSES.

1,347,653.      Specification of Letters Patent.      Patented July 27, 1920.

Original application filed March 4, 1915, Serial No. 12,028. Divided and this application filed June 5, 1915, Serial No. 32,259. Renewed December 12, 1919. Serial No. 344,465.

*To all whom it may concern:*

Be it known that I, ARTHUR E. PAIGE, a citizen of the United States, residing at Philadelphia, in the State of Pennsylvania, have invented a certain new and useful Improvement in Mechanism for Making Bifocal Lenses, whereof the following is a specification, reference being had to the accompanying drawings.

My invention relates to means for producing curved surfaces, and particularly such surfaces as adjoin each other and are respectively uniformly curved to the junction line between them, so as to sharply define the latter. As hereinafter described, such means are adapted to surface one side of glass to contemporaneously form a pair of bifocal lenses, the glass being held with the respective minor areas adjoining each other and between their respective major areas and concentrically rotated in coöperative relation with abrading means common to the glass which forms both members of such a pair. Such abrading means includes a lap having an annular abrading surface presenting only a transverse line of contact to the glass and having one circumferential edge of said annular surface presented tangentially to the junction line between the major and minor lens areas, so that that edge of the abrading surface extends obliquely over said junction line from its point of contact with the glass; whereby the glass is abraded in a direction transverse to said junction line, so as to sharply define the latter. As hereinafter described such oblique relation is determined by having the axes of rotation of the glass and of the lap neither parallel nor at right angles, but in acutely oblique transverse relation, and, although the lap axis may be maintained in radial relation with the axis of rotation of the glass, and is preferably so maintained in abrading the minor lens surfaces, because the line of contact between the lap and the glass then intersects the center of rotation of the minor lens areas; the axis of rotation of the laps may extend tangentially to a circle described by rotation of any point on the surface of the glass, and is preferably thus maintained in abrading the major lens surfaces; because the path of the abrading material moved by the lap is then in a direction transverse to the path of the abrading material moved by the glass, thus imparting a compound decussative motion to said material and preventing it from forming concentric ruts or scratches in the glass. Moreover, by presenting the line of contact of the lap with the glass in tangential relation to a circle of rotation of the latter, a spherically curved surface of a given radius may be produced by a lap surface of less radius, which is advantageous in that such a lap may be adjusted to and from radial and tangential position to compensate for wear of its abrading surface. For instance, a lap having a conoidal abrading surface which is arcually curved respectively differently transversely and circumferentially, when presenting a transverse line of contact to the glass in radial relation to the axis of rotation of the latter, produces a spherical surface of precisely the same radius as the transverse curvature of the lap surface, and, as the lap surface is rendered more convex by use, the line of contact may be shifted to tangential relation to a circle of rotation of the glass to produce a spherical surface of the given radius with the lap surface then of a less radius. Of course, such adjustment to and from radial and tangential position is limited to the extent of the radius of the circular perimeter of the minor lens areas.

My invention includes the various novel features of construction and arrangement of the conoidal laps hereinafter more definitely specified.

This is a division of my application Serial 12,028 filed March 4, 1915, wherein surfacing mechanism of the character herein described is claimed. The method of surfacing herein described is claimed in my application Serial 30,716 filed May 27, 1915, which is also a division of said application Serial 12,028.

In the drawings:—Figure I is a fragmentary plan view of a surfacing machine, including vertically opposed spindles by which the glass and laps may be respectively rotated; the upper spindle being capable of axial, oscillatory, and lateral adjustment. Said machine also includes a lap supporting lever extending transversely to the axis of rotation of the glass, which is not only capable of universal oscillatory movement upon its fulcrum, to shift the laps to and from the glass, but is also capable of adjustment longitudinally with respect to its fulcrum, and by turning upon its longitudinal axis, to precisely determine the position of the region of contact between the laps and glass, relatively to the axis of rotation of the latter. One rotary conoidal lap is indicated in dash lines in position to present only a transverse line of contact of its annular abrading surface to the major lens surface of the glass, in tangential relation to a circle of rotation of said glass.

Fig. II is a vertical sectional view of a rotary glass holder and glass, and a rotary conoidal lap arranged to present only a transverse line of contact of its annular abrading surface to the minor lens surface of said glass; said lap being supported by a coupling connecting said upper spindle of the surfacing machine with a pivotal bearing for the lap spindle, which is capable of oscillatory adjustment in the plane of the line of contact of the lap with the glass; the lap spindle having means resiliently engaging said bearing and preventing axial displacement of said lap.

Fig. III is a vertical sectional view similar to Fig. II but showing a lap spindle bearing directly connected with the horizontal lever of said surfacing machine, without the interposition of the pivot bearing bar shown in Fig. II.

Fig. IV is a sectional view similar to Fig. II but showing a lap for abrading the major lens surfaces, provided with retaining means like the lap shown in Fig. III.

Fig. V is a fragmentary sectional view of the lap shown in Fig. III, showing its abrading surface covered with a sheet of textile fabric secured by an elastic sphincteral band.

Fig. VI is a diagrammatic plan view indicating, in dash lines, a lap having its annular abrading surface presenting a transverse line of contact to said glass, at the minor lens area of the latter and in radial relation with the axis of rotation of the glass.

Fig. VII is a vertical sectional view showing laps adapted to respectively abrade the major and minor lens surfaces, mounted upon a common spindle, upon which they may be independently rotated at different speeds.

Fig. VIII is a fragmentary sectional view of the laps shown in Fig. VII, with their abrading surfaces covered by respective sheets of textile fabric secured by elastic sphincteral bands.

Fig. IX is a vertical sectional view, similar to Fig. VII, but showing a single lap having the respectively differently curved annular abrading surfaces for abrading the major and minor lens surfaces.

Fig. X is a plan view similar to Fig. VI but showing that the contact between the lap and the glass arranged as in Fig. IX is only at a line, which is radial with respect to the lap axis, because both of the annular surfaces of said lap are respectively differently curved transversely and circumferentially.

Fig. XI is a vertical sectional view similar to Fig. IX but showing a lap having an annular abrading surface for the major lens surfaces which is spherically curved i. e., arcually curved the same both transversely and circumferentially, whereas, the annular abrading surface for the minor lens surfaces is arcually curved respectively differently transversely and circumferentially.

Fig. XII is a plan view similar to Fig. X but showing that whereas the annular abrading surface of the lap shown in Fig. XI for abrading the minor lens surfaces presents only a line of contact to the glass, which is radial with respect to the lap axis; the annular abrading surface of said lap for the major lens surfaces presents an area of contact to the glass which is a lune of a spherical surface.

Fig. XIII is an elevation, partly in longitudinal section, of the surfacing machine, shown in Fig. I, looking toward the left in that figure, but with the upper and lower spindles in the position contemplated in Fig. II and showing the lever support and its appurtenances as in Fig. IX.

Fig. XIV is an elevation, partly in transverse section, of the surfacing machine shown in Figs. I and XIII.

The machine shown in Fig. I may be conveniently employed in roughing glass blanks, by rotating them and a lap upon a common axis but respectively different spindles which are relatively adjustable both axially and laterally and, preferably, rotated in opposite directions so as to attain the maximum speed of grinding with the minimum centrifugal discharge of the abrading material. In said machine, the lower spindle 8 is journaled in the base frame 1 and has the pulley 9 for rotation by the belt 10, and has the conical cap 11 for detachable engagement with the glass holder 12 upon which the lens blanks 13 are detachably mounted, conveniently with pitch cement. Said base 1 also supports the table 15 upon which the pan 16 is removably supported in concentric relation with said spindle 8. The upper spindle 18 which is journaled in the frame 2, tiltable and capable of straight lateral movement on said base frame 1, is provided with the pulley 19 and belt 20 by which it may be rotated. Said pulley 19 is keyed to said spindle 18 so that the latter may be raised and lowered through it by means of the quill 22 having rack teeth 23 engaging the gear 24 which may be turned by hand.

Said quill may be prevented from rotating by a suitable key, adjustable by the set screw 32. Said spindle 18 has at its lower end the conical cap 29 for detachable engagement, directly, with ordinary spherical laps which may be rotated in axial alinement with, or eccentrically to, the spindle 8, and glass holders 12 thereon, when the set screw 32 in the quill is retracted. When said spindle 18 is prevented from rotating it may be used to support the other laps hereinafter described, for instance as shown in Fig. II, to precisely determine the approach thereof to the glass. However, it is to be understood that other means may be employed to effect the grinding of the blanks preliminary to the employment of the laps which have their axes extending obliquely with respect to the axis of rotation of the glass as herein set forth.

The lap supporting lever 34 shown in Figs. I and IX, and the lever 35 shown in Fig. III, have a universal fulcrum support and stop mechanism, to precisely determine their positions, conveniently mounted upon said table 15 as shown in Fig. I. Said fulcrum support includes the socket base 45 in which the cylindrical shank 46 of the yoke 47 may be turned and vertically adjusted, and clamped by the set screw 48 when in adjusted position; said set screw 48 being in screw threaded engagement with said base 45. Said yoke 47 has the oppositely alined cone pointed screws 50 engaging the sleeve 51 in which said levers may be turned and longitudinally adjusted, and clamped in adjusted position by the set screw 53 which is in screw threaded engagement with said sleeve. However, it may be observed that when said parts are adjusted and clamped by the screws 48 and 53, said levers are free to oscillate in a vertical plane upon the common axis of said screws 50, and each lever is conveniently provided with a handle 55 by which it may be manipulated as a support by which the laps 56, 57 etc., may be presented in operative relation with the pairs of lens blanks 13 supported and rotated by the holders 12 on the spindle cap 11.

Although when clamped by the screws 48 and 53, said levers 34 and 35 are ostensibly prevented from moving except in a vertical plane; it is practically impossible to make them so rigid that they can not be otherwise moved within the limit of their resilience, and, in fact, they may be bent and twisted, without permanent distortion, when clamped by the supporting means above described, to such a degree that I find it convenient to provide stop mechanism for the handle end of said levers by which their movement may be precisely limited. As shown in Fig. I; the stop bracket 60, mounted upon said table 15, carries the stop block 61 upon the bolt 62 which has a squared shank mounted to slide in the slot 63 in said bracket and is provided with the wing nut 64 by which said block 61 may be secured in any position of adjustment to which it may be shifted by the thumb screws 65 and 66 which are in screw threaded engagement with said bracket 60. Each lever is conveniently provided with a stud 68 which may be selectively engaged with any link of the chain 69 at the upper end of the spring 70 which is connected with said bracket 60, at its lower end, by the screw 71, and it is to be understood that the approach of the laps to the glass, both laterally and vertically, is precisely predetermined and limited by the location of said stop block 61. For instance, said levers may be set to present a lap in position to abrade the glass carried by the holder 12 and with a space between the lower side of said lever and the proximate upper surface of the recessed end of said block 61 corresponding with the thickness of the glass which is to be removed, and, said spring 70 being connected with said lever 52 as above described, the abrading operation may proceed without further attention of the operator except as to the maintenance of the proper quantity of abrading material and water or other liquid vehicle between the lap and the glass.

It is to be understood that although I have shown the glass upon the holders 12 in the form of individual lens blanks 13, other forms may be employed with equal facility, for instance, a single piece of glass of the outer configuration of the holder 12, may be suitably surfaced and subsequently cut apart, at its shortest diameter, to form a pair of bifocal lenses, or a circular glass blank may be thus surfaced and subsequently cut apart, upon any diametrical line to form a pair of bifocal lenses.

Fig. II is a vertical sectional view showing the lap spindle bearing casing 75 supported by a detachable coupling 76 connecting it with the cap 29 of the upper spindle 18 of the machine shown in Fig. I; said spindle 18 being rigidly connected with the vertically adjustable quill 22 when thus used. Said coupling 76 has the set screw 77 for securing it in adjusted position upon said cap 29, so that said coupling may be turned to present the axis of the lap spindle in a plane which is radial to the axis of rotation of the glass holder 12 or in tangential relation to a circle of rotation of the glass as above contemplated. Said coupling 76 also has the set screw 78 by which the pivot bar 80 may be rigidly held in adjusted position; said bar being bifurcated at its lower end to receive the radial flange 81 of said spindle bearing casing 75, which is pivotally connected therewith by the screw 83 which has a smooth cylindrical portion extending through said flange 81 but is in screw threaded engagement with said bar 80. The oscillatory movement of said flange 81 in said bar 80 is limited and the parts clamped in adjusted relation by the screw 85 which extends freely through the openings 86 in said bar but is in threaded engagement with said flange 81. Said screw may be jammed in adjusted position by the nut 87.

Said lap spindle bearing casing 75 carries a ball bearing including the outer shell 89 tightly fitted in said casing 75 and the sleeve 90 rotatable in said casing, and the lap 57, has its spindle 91 provided with means for preventing accidental axial displacement of the lap, including the resilient ring 92 which is normally of slightly larger diameter than said spindle but is compressed to frictionally engage said sleeve 90, as shown in Fig. II, when said spindle is thrust through said sleeve 90 into the operative position shown in said figure.

Said lap 57 is adapted to abrade the minor lens surfaces 99 on a diametrical line, as indicated at 107 in Fig. VI; said line extending in a radial plane with respect to the axis of rotation of said lap 57 and transversely to the annular conoidal abrading surface thereof.

Fig. III is a vertical sectional view similar to Fig. II, but showing a lap spindle bearing casing 109 directly connected with and supported by the horizontal lever 35, with which it may be rigidly connected by the set screw 111. Said lever 35 may be conveniently supported, adjusted and set in connection with said surfacing machine, like the lever 34 above described. Said casing 109 incloses a ball bearing similar to that shown in Fig. II, including a sleeve 90 having an annular recess which is adapted to detachably engage the spring 114 which is seated in the slot 115 of the spindle 116 of the lap 117. Said spring has its upper end rigidly connected with said spindle 115 but is free to resiliently oscillate radially with respect to said spindle and normally projects therefrom to the extent indicated in Fig. IV. Said bearing casing 109 is conveniently provided with the screw cap plate 118 at its lower end to retain the felt washer 119, through which said spindle is inserted and removed, so as to automatically wipe and oil said spindle each time it is inserted. Said lap 117 is otherwise constructed like the lap 57 and similarly adapted to abrade the minor lens surfaces 99 on a diametrical line as indicated at 107 in Fig. VI.

Fig. IV shows the lap 56 (which is indicated by dash lines in Fig. I), having its spindle 112 provided with a spring 114 like the lap 117 but being otherwise constructed like the lap 57 above described and adapted to abrade the major lens surfaces 98 on the line 120 tangential to a circle of rotation of the glass, as indicated in Figs. I and VI; said line extending in a radial plane with respect to the axis of rotation of said lap 56 and transversely to the annular conoidal abrading surface thereof. As above set forth, said lap may be thus disposed with its axis in tangential relation to a circle of rotation of the glass, not only to impart the maximum scribbling motion to the abrading material, but to form a spherical lens surface of a given radius, with the abrading surface of the lap having a transverse curvature of less radius.

In the position shown in Figs. I and IV, said lap 56 is so set that the smaller circumferential edge of its abrading surface, which is in contact with the glass 13, is tangential to the circular junction line between the major lens areas 98 and the minor lens areas 99. Said junction line is indicated in Figs. II, III, IV, and in other sectional views of the glass, by short straight lines which extend vertically downwardly from the upper surface of the glass, but which are not intended to indicate any division in the glass, but merely to indicate the position of the laps with reference to said junction lines which are otherwise difficult to locate in the sectional views in view of the slight difference in curvature between the adjoining surfaces. It may be observed, with reference to Fig. IV, that said smaller circumferential edge of the abrading surface of the lap 56 extends obliquely over said junction line from its point of contact with the glass; whereby the glass is abraded by said lap in a direction transverse to said junction line, so as to sharply define the latter; the glass being rotated in the direction of the arrow in Fig. I while the lap is rotated in the same direction. Although said lap may be caused to rotate in that direction merely by frictional engagement with the surface of the glass rotating in that direction, I find it preferable to rotate all of the laps at a higher speed than the glass and this may be conveniently done by the belt 121 engaging the respective grooves 122 in the lap, as shown in Figs. II, III and IV, and extending thence around any suitable driving pulley. The reason for rotating the glass, is, of course, to successively present at the line of contact with the laps all of the area of the glass which is to be abraded by the latter. The reason for rotating the laps at a higher speed is to attain the maximum relative movement of the lap and glass surfaces which is possible with the employment of a pulverulent abrading medium; such speed being limited by the centrifugal effect upon said material, for, if the laps are rotated at too great a speed said material will be thrown off the glass upon which it must be retained to have any abrading effect. The reason for rotating the laps in the same direction as the glass is to minimize the chance of producing scratches by irregular particles of the abrading material which might be retained in damaging relation to the glass if the glass and laps are rotated in opposite directions, as the abrading material is then piled up by the opposite feeding movement thereof by the glass and laps.

Of course, said lever 34, is set in respectively different positions in order to present the annular abrading surfaces of said laps 56, 57 etc., respectively in operative relation with the major and minor lens surfaces of the glass 13. The position of said lever shown in full lines in Fig. I is approximately that which it occupies when supporting said lap 56 as shown in Figs. I, and IV. The dash line which is radial to the center of oscillation of said lever 34 in Fig. I indicates its position when supporting the lap 57, as in Fig. II, it being thus shifted slightly more to the right, to bring the smaller circumferential line of its annual abrading surface tangential to the circle defining the minor lens areas in Figs. I and VI; and as indicated by the smaller elliptical dash line in Fig. VI.

It is to be understood that any of said laps may be provided with a cover of textile fabric or other flexible sheet material 125 retained thereon by an elastic sphincteral band 126 as shown in Figs. II and V; such coverings serving as vehicles to retain the pulverulent abrading material upon the abrading surfaces of the laps.

Although I find it convenient to employ the respectively independent laps above described so that the minor and major lens surfaces may be abraded by different operators at different times; it is to be understood that such conoidal laps may be employed to simultaneously abrade both the major and minor surfaces of the same glass. For instance, as shown in Fig. VII, the laps 128 and 129 which have annular abrading surfaces respectively adapted to abrade the major lens surfaces 98 and minor lens surfaces 99 of the glass 13 which is rotated by the holder 12, shown in said figure, have the common spindle 130 and may be simultaneously rotated, upon the same axis, by the belts 121, at respectively different speeds, if desired, or they may both be rigidly connected with said spindle by their respective set screws 131 and 132 so as to be rotated together. The relative axial position of said laps 128 and 129 may be precisely predetermined by adjustment of the nuts 134 which are in screw threaded engagement with the inner hub of said lap 128. Such construction and arrangement is advantageous in that the laps 128 and 129 may have their abrading surfaces separately ground to a variable extent and yet be precisely adjusted for the desired coöperative effect upon the glass.

Whether rotated independently or clamped together, as above described; said laps 128 and 129 are conveniently mounted for rotation in the spindle bearing pivot frame 136 having the adjustable bearing screws 137 and 138 which may be set to hold said spindle 130, or the spindles of any of the laps above described. Said pivot frame 136 is conveniently mounted for oscillation in the yoke 139 which has the set screw 140 for securing it in rigid relation with the cap 29 of the spindle 18 above described, and carries at the lower ends of its bifurcations, opposite, axially alined screws 142 having conical heads 143 fitted in corresponding sockets in said pivot frame 136 and having wing nuts 144, exterior to said yoke 139 so that said frame 136 may be freed for oscillation in said yoke or clamped in rigid relation therewith. I prefer to limit the oscillatory movement of said frame 136 in said yoke 139 by providing the latter with the clamping screw 147 having the conical head 148 extending in the arcual slot 149 in said frame 136; said screw 147 being provided with the wing nut 150 exterior to said yoke, by which said frame 136 may be clamped in rigid relation with said yoke. Of course, if a permanently rigid construction is desired, the bearing screws 137 and 138 may be directly mounted in the yoke 139, without the interposition of the frame 136.

As indicated in Fig. VIII either or both of said laps 128 and 129 may have its abrading surface provided with a cover of textile fabric or other flexible sheet material 125 retained thereon by an elastic sphincteral band 126.

As shown in Fig. IX, my improved surfacing mechanism may be further simplified by providing a single lap 153 having the respectively differently curved annular abrading surfaces 154 and 155, meeting at the circular line indicated at 156 and respectively adapted for abrading the major lens surfaces 98 and minor lens surfaces 99 of the glass 13 which is mounted to be rotated on the holder 12 as above described. Said lap 153 may be mounted for rotation in any of the lap spindle bearings above described but is shown mounted in the bearing 75 supported by the lever 34 with which it is adjustably connected by the coupling 151 having the set screw 152 for securing the bar 80 of said bearing, and said coupling, in adjusted position on said lever.

Said lap 153 has annular abrading surfaces which are like those of the laps 56, 57, etc., in that they are respectively differently arcually curved transversely and circumferentially and, as indicated in Fig. X, the annular abrading surfaces 154 and 155 of said lap 153 are in contact with the glass only at a line 158 which is radial with respect to the lap axis.

As the laps above described present only respective lines of contact to the major and minor lens surfaces, and the former are of greater area than the latter, a longer time is required to produce a given surface upon the major areas than upon the minor areas, although the difference is minimized by the relatively greater diameter and consequent surface speed of movement of the annular abrading surfaces of the laps which are applied to the major areas. Therefore, I find it convenient to provide the lap 160 shown in Fig. XI, which differs from the lap 153 above described in that its annular abrading surface 161 which is presented to the major glass surfaces 98 is spherically curved i. e., arcually curved the same both transversely and circumferentially; so that, as indicated in Fig. XII, said surface 161 presents an area of contact to the glass which is a lune of a spherical surface, the contour thereof, in plan, being indicated by the dash lines 162 in Fig. XII. Said spherical abrading surface of the lap 160 terminates at the circle indicated by the dotted line 164 in Fig. XI, and the adjacent annular abrading surface 165, which is presented to the minor glass areas 99, is arcually curved respectively differently transversely and circumferentially so as to present only a line of contact to the glass as indicated at 167 in Fig. XII. Such construction of the abrading surface 165 is necessitated by the fact that its curvature (four dioptric) is of greater radius transversely than the curvature (six dioptric) of said abrading surface 161, and, if said surface 165 were a zone of a sphere of such greater radius it would, of course, sweep over the major glass areas 98 and eliminate the desired curvature of the latter.

It may be observed that in the employment of both of the laps 153 and 160 the smaller circumferential edges of the abrading surfaces which are respectively in contact with the major and minor glass areas extend obliquely over the circular junction line between said areas, from respectively opposite sides of said line; whereby the glass is abraded in a direction transverse to said junction line, so as to sharply define the latter. It is to be noted that the abrasion is not effected by the surface of the lap but by the pulverulent abrading material which is free to move between the adjacent surfaces of the lap and glass, and has a motion which is the resultant not only of the circular rotation of the lap and glass with their axes in the oblique relation described, but of the so called centrifugal force generated by such movement; the effect of said force being always to produce a tangential motion of each particle of the abrading material, outwardly with respect to the axis of rotation of the element supporting said particle at any instant. That the glass is abraded in a direction transverse to said junction line is clearly indicated by the score marks made in the glass by granules of the abrading material. The expression "obliquely transverse" is employed to indicate the contemplated direction more precisely than is indicated by the word "transverse" alone, which is comprehensive of the right angular relation as distinguished from the diagonal or oblique crossing movement contemplated, which is the result of the traverse of the particles of the abrading material in evolute paths, under the several forces acting upon them as aforesaid.

It is to be understood that said laps 153 and 160 may have their abrading surfaces covered with textile fabric or other flexible sheet material 125 retained thereon by elastic sphincteral bands 126, as indicated in Fig. XI.

It may be observed that the ball bearings above described have no means for compensating for wear which is incident to the rotation of the laps at high speed, and, although they are of an ordinary commercial type and may be readily and cheaply replaced, I prefer to employ in each of the lap spindle bearings above described, ball bearings which are adjustable to not only compensate for wear but compensate for slight differences in the diameters of the lap spindles which are adapted to slide through the sleeves 90 of said bearings, to and from their operative position. Therefore, I have shown in Fig. XI a lap spindle bearing casing 170 having tightly but removably fitted therein a ball bearing including the stationary race ring 171 and rotatable sleeve 172; the latter being radially split at both ends so that it may be constricted upon the lap spindles to rigidly engage them, regardless of slight differences in their respective diameters. Said sleeve 172 has its conical end 173 encircled by the double conical annular ball race ring 175 for the balls 176 which are embraced between said ring 175 and the nut 178 which is in screw threaded engagement with the upper end of said sleeve 172. Said nut 178 is a complete annulus but has radial notches 179 which may be engaged by a screw driver or similar implement inserted through the opening 180 in said bearing casing 170 to hold said nut 178 temporarily stationary while the sleeve 172 is being adjusted in engagement therewith. The construction and arrangement above described is such that when said nut 178 is temporarily prevented from rotating with the sleeve 172, and the latter is turned, either by a tool engaging the radial slots therein or by frictional engagement with the lap spindle, said nut 178 is drawn toward the race ring 175 to take up all lost motion. Said screw thread connecting said sleeve 172 with said nut 178 is preferably so inclined as to be tightened by rotation of said sleeve in the direction in which it is rotated with the lap spindle.

Although the supports for the lap spindle bearings above described as capable of oscillatory movement may be rigidly secured when adjusted to the proper angle to produce the desired surface upon the glass, and the curvature of the glass surfaces abraded by the laps thus supported may be precisely predetermined by such adjustment and maintenance of the laps; it is to be noted that ordinarily lens surfacing operations are facilitated by permitting the laps to have such freedom of movement as to accommodate themselves to the curvature of the glass, particularly during the polishing operation. Therefore, it may be observed that the bearings constructed and arranged in accordance with my invention as above described, permit such freedom of movement, and laps embodying my invention may be thus used. For instance, glass which has been surfaced to the desired curvature by any convenient means and requires to be finally finished or polished may be subjected to the operation of the conoidal laps above described, with the latter free to oscillate to such extent as to accommodate themselves to the curvature determined by the glass itself, and, in such use of said laps their effect is rendered as accurate as possible by the fact that their centers of oscillation are nearer the surface of the glass being abraded than the center of curvature of the surface which is being formed; so as to stabilize the laps, with respect to the glass, regardless of their freedom aforesaid. It may be observed that in Fig. VII the center of oscillation of the laps is below the surface of the glass which is being abraded, as distinguished from the construction and arrangement illustrated in the preceding figures, wherein the centers of oscillation of the respective laps are above the glass; however, in either case, the centers of oscillation are intermediate of the length of the lines of contact of the laps with the glass. Moreover, it is to be noted that when permitted such freedom of oscillation, it is limited to planes which are radial with respect to the laps and coincident with the lines of contact which the laps present to the glass.

It is to be noted that all chords of the transverse curves of the double zoned surfacing tools above described converge toward their axes, in the same general direction; whereby all abrading surfaces of each such tool are adapted to receive a covering of said textile fabric or other flexible sheet material 125, which is, of course, primarily plane. If the chords of said abrading surfaces were parallel, or approximately parallel, with the axes of rotation thereof; it would be impossible to thus provide said surfaces with a seamless textile covering of said primarily plane sheet material. It is practically impossible to employ a seamed covering because of the incident irregularities in the surface thereof which produce defects in the glass surface.

I do not desire to limit myself to the precise details of construction and arrangement above described as it is obvious that various modifications may be made therein without departing from the essential features of my invention as defined in the appended claims.

I claim:—

1. A rotary lap having a perimetral abrading surface extending transversely to its axis of rotation and arcually curved respectively differently concentrically to said axis and transversely thereto; one edge of said surface being nearer the lap axis than the opposite edge.

2. In surfacing mechanism, the combination with a rotary lap having an annular abrading surface and an axial spindle in rigid relation therewith, and a conical bearing surface at each end of said spindle; of a support movable toward and away from the material to be surfaced; and means detachably connecting said lap with said support, including a pivoted member having axially adjustable conical bearing surfaces arranged to detachably engage the ends of said spindle.

3. In surfacing mechanism, the combination with a rotary lap having an annular abrading surface and an axial spindle in rigid relation therewith, and a conical bearing surface at each end of said spindle; of a support movable toward and away from the material to be surfaced; and means detachably connecting said lap with said support, including a member having axially adjustable conical bearing surfaces arranged to detachably engage the ends of said spindle.

4. In surfacing mechanism, the combination with a rotary lap having a transversely curved abrading surface and an axial spindle extending obliquely to said surface in rigid relation therewith, and a conical bearing surface at the end of said spindle; of a support movable toward and away from the material to be surfaced; and means detachably connecting said lap with said support, including a member having an axially adjustable conical bearing surface arranged to detachably engage the end of said spindle.

5. A rotary lap having a rigid spindle, an annular abrading surface which is a spherical zone, in concentric relation with said spindle, and an annular abrading surface, in concentric relation with said spindle, curved respectively differently transversely and circumferentially; the chords of the transverse arcs of each of said surfaces being inclined with respect to the axis of said spindle.

6. A rotary surfacing tool having, in concentric relation to a common axis, two distinct and differently curved annular abrading zones, in variable axially spaced relation; one being curved respectively differently transversely and circumferentially; the greatest radial extent of each of said zones, from said axis, being less than the radius of curvature of its abrading surface; all chords of transverse curves of said zones converging toward said axis, in the same general direction.

7. A rotary surfacing tool having, in concentric relation to a common axis, two distinct and differently curved annular abrading zones; one being curved respectively differently transversely and circumferentially; the greatest radial extent of each of said zones, from said axis, being less than the radius of curvature of its abrading surface; all chords of transverse curves of said zones converging toward said axis, in the same general direction.

8. A rotary surfacing tool having, in concentric relation to a common axis, two distinct and differently curved annular abrading zones; one being curved respectively differently transversely and circumferentially; all chords of transverse curves of said zones converging toward said axis, in the same general direction.

9. A rotary surfacing tool having, in concentric relation to its axis, an annular abrading zone, curved respectively differently transversely and circumferentially; the greatest radial extent of said zone, from said axis, being less than the radius of transverse curvature of its abrading surface; all chords of transverse curves of said zone converging toward said axis.

10. A rotary surfacing tool having two distinct annular abrading zones concentric with its axis; one being a zone of a sphere, and the other being curved respectively differently transversely and circumferentially; the greatest radial extent of each of said zones, from said axis, being less than the radius of said sphere.

11. In bifocal lens surfacing mechanism, the combination with a rotary holder for the glass which is to be abraded; of two rotary laps, having a common axis, and each having an annular conoidal abrading surface arcually curved differently circumferentially and radially; said abrading surfaces being curved differently in the respective laps; means arranged to present said laps with said abrading surfaces in respective operative relation to the respective lens areas, with only a transverse line of contact between each lap and the lens area which it is to abrade, in a plane which is radial to the axis of rotation of the respective lap, and with their smaller circumferential edges tangential to the junction line between said lens areas, so that said edges extend over said line from the respective points of contact of said laps with the surfaces to be abraded, and from respectively opposite sides of said line; whereby the edges of the respective lens areas adjoining said line are abraded transversely to said line, so as to sharply define the latter: means supporting said laps, permitting oscillation of their respective axes; means limiting such freedom of oscillation of each lap to a plane which is radial to its axis; means arranged to positively rotate said holder; and means arranged to positively rotate the respective laps, independently of each other.

12. In bifocal lens surfacing mechanism, the combination with a rotary holder for the glass which is to be abraded; of two rotary laps, each having an annular abrading surface arcually curved differently circumferentially and radially; means arranged to present said laps with said abrading surfaces in respective operative relation to the respective lens areas, with only a transverse line of contact between each lap and the lens area which it is to abrade, and with their smaller circumferential edges at the junction line between said lens areas, so that said edges extend over said line from the respective points of contact of said laps with the surfaces to be abraded, and from respectively opposite sides of said line; whereby the edges of the respective lens areas adjoining said line are abraded transversely to said line, so as to sharply define the latter: means supporting said laps, permitting oscillation of their respective axes; means limiting such freedom of oscillation of each lap to a plane which is radial to its axis; means arranged to positively rotate said holder; and means arranged to positively rotate the respective laps, independently of each other.

13. In bifocal lens surfacing mechanism, the combination with a rotary holder for the glass which is to be abraded; of two rotary laps, each having an annular conoidal abrading surface arcually curved circumferentially and radially; means arranged to present said laps with said abrading surfaces in respective operative relation to the respective lens areas, with only a transverse line of contact between each lap and the lens area which it is to abrade, and with one circumferential edge of each lap at the junction line between said lens areas, so that said edges extend over said line from the respective points of contact of said laps with the surfaces to be abraded, and from respectively opposite sides of said line; whereby the edges of the respective lens areas adjoining said line are abraded transversely to said line, so as to sharply define the latter; means supporting said laps, permitting oscillation of their respective axes; means limiting such freedom of oscillation of each lap to a plane which is radial to its axis; means arranged to positively rotate said holder; and means arranged to positively rotate the respective laps, independently of each other.

14. In bifocal lens surfacing mechanism, the combination with a rotary holder for the glass which is to be abraded; of two rotary laps, having a common axis, and each having an annular conoidal abrading surface arcually curved differently circumferentially and radially; said abrading surfaces being curved differently in the respective laps; means arranged to present said laps with said abrading surfaces in respective operative relation to the respective lens areas, with only a transverse line of contact between each lap and the lens area which it is to abrade, in a plane which is radial to the axis of rotation of the respective lap, and with their smaller circumferential edges tangential to the junction line between said lens areas, so that said edges extend over said line from the respective points of contact of said laps with the surfaces to be abraded, and from respectively opposite sides of said line; whereby the edges of the respective lens areas adjoining said line are abraded transversely to said line, so as to sharply define the latter.

15. In bifocal lens surfacing mechanism, the combination with a rotary holder for the glass which is to be abraded; of two rotary laps, each having an annular abrading surface arcually curved differently circumferentially and radially; means arranged to present said laps with said abrading surfaces in respective operative relation to the respective lens areas, with only a transverse line of contact between each lap and the lens area which it is to abrade, and with their smaller circumferential edges at the junction line between said lens areas, so that said edges extend over said line from the respective points of contact of said laps with the surfaces to be abraded, and from respectively opposite sides of said line; whereby the edges of the respective lens areas adjoining said line are abraded transversely to said line, so as to sharply define the latter.

16. In bifocal lens surfacing mechanism, the combination with a rotary holder for the glass which is to be abraded; of two rotary laps, each having an annular conoidal abrading surface arcually curved circumferentially and radially; means arranged to present said laps with said abrading surfaces in respective operative relation to the respective lens areas, with only a transverse line of contact between each lap and the lens area which it is to abrade, and with one circumferential edge of each lap at the junction line between said lens areas, so that said edges extend over said line from the respective points of contact of said laps with the surfaces to be abraded, and from respectively opposite sides of said line; whereby the edges of the respective lens areas adjoining said line are abraded transversely to said line, so as to sharply define the latter.

In testimony whereof, I have hereunto signed my name at Philadelphia, Pennsylvania, this fourth day of June, 1915.

ARTHUR E. PAIGE.

Witnesses:
 FRANK E. PAIGE,
 ANNA ISRAELVITZ.